(12) United States Patent
Barna (10) Patent No.: US 9,386,715 B1
(45) Date of Patent: Jul. 5, 2016

(54) LIQUID TIGHT ELECTRICAL HOUSING

(71) Applicant: Kyle Steven Barna, Syracuse, NY (US)

(72) Inventor: Kyle Steven Barna, Syracuse, NY (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/630,192

(22) Filed: Feb. 24, 2015

(51) Int. Cl.
*H05K 5/06* (2006.01)

(52) U.S. Cl.
CPC ........................................ *H05K 5/069* (2013.01)

(58) Field of Classification Search
USPC ........................................................ 174/50.6
See application file for complete search history.

(56) References Cited

U.S. PATENT DOCUMENTS

| | | | |
|---|---|---|---|
| 3,478,297 A | 11/1969 | Gimpel et al. | |
| 3,731,258 A | 5/1973 | Spicer | |
| 4,483,575 A | 11/1984 | Kruger et al. | |
| 4,625,073 A | 11/1986 | Breesch et al. | |
| 4,900,068 A | 2/1990 | Law | |
| 5,051,541 A | 9/1991 | Bawa et al. | |
| 5,145,410 A | 9/1992 | Maejima et al. | |
| 5,635,678 A | 6/1997 | Yasukuni | |
| 5,866,853 A | 2/1999 | Sheehan | |
| 6,100,470 A * | 8/2000 | Gretz | H01R 13/745 174/17.08 |
| 6,174,201 B1 | 1/2001 | Murakami et al. | |
| 6,585,297 B2 | 7/2003 | Mullen, Jr. | |
| 6,676,441 B1 | 1/2004 | Knudsen | |
| 6,913,486 B2 | 7/2005 | Nagayasu et al. | |
| 7,028,401 B2 | 4/2006 | Kawakita et al. | |
| 7,041,907 B2 | 5/2006 | Miyazaki | |
| 7,048,561 B1 | 5/2006 | Elbaz | |
| 7,086,899 B1 | 8/2006 | Miyakawa et al. | |
| 7,201,609 B2 | 4/2007 | Ishikawa | |
| 7,210,962 B2 | 5/2007 | Kameyama et al. | |
| 7,270,556 B2 | 9/2007 | Mori et al. | |
| 7,285,014 B2 | 10/2007 | Castaldo et al. | |
| 7,390,027 B2 | 6/2008 | Kiely | |
| 7,394,021 B2 | 7/2008 | Magno, Jr. | |
| 7,429,193 B2 | 9/2008 | Cairns et al. | |
| 7,476,121 B2 | 1/2009 | Tsuji | |
| 7,658,418 B1 | 2/2010 | Elbaz et al. | |
| 7,713,089 B2 | 5/2010 | Faust et al. | |
| 7,843,684 B2 * | 11/2010 | Lu | H05K 5/06 165/104.33 |
| 8,011,976 B2 | 9/2011 | Ooki | |
| 9,040,821 B2 * | 5/2015 | Blanchard | B64C 3/18 174/50 |
| 2010/0258157 A1 | 10/2010 | Arai | |
| 2011/0045697 A1 | 2/2011 | Sawamura | |
| 2011/0097917 A1 | 4/2011 | Coyle, Jr. | |

* cited by examiner

*Primary Examiner* — Dhirubhai R Patel
(74) *Attorney, Agent, or Firm* — King & Spalding LLP (57) ABSTRACT

A liquid tight electrical housing is described herein and can include a housing body. The housing body can include a first housing body piece and a second housing body piece removably coupled to the first housing body piece, where the second housing body piece includes a third opening and a fourth opening, where the fourth opening includes a complementary housing coupling feature that removably couples to a housing coupling feature in a second opening of the first housing body piece. The housing can also include a first coupling component disposed in a first opening of the first housing body piece, where the first coupling component is configured to couple to a first electrical enclosure. The housing can also include a second coupling component disposed in the third opening of the second housing body piece, where the second coupling component is configured to couple to a second electrical enclosure.

20 Claims, 6 Drawing Sheets

LIQUID TIGHT ELECTRICAL HOUSING

TECHNICAL FIELD

The present disclosure relates generally to electrical housings and more particularly to systems, methods, and devices for liquid tight electrical wiring housings.

BACKGROUND

Electrical housings can be used for a number of purposes. For example, electrical housings can be used to connect ends of one electrical cable to ends of another electrical cable. In such a case, a user may occasionally need to access the electrical housing to perform maintenance and repairs. In some situations, the electrical housing is located in an environment that is subject to adverse environmental conditions, such as moisture. In such a case, accessing the electrical housing designed for such adverse environmental conditions can be time consuming because of the configuration of such electrical housings. Further, electrical housings designed for such adverse environmental conditions can be expensive.

SUMMARY

In general, in one aspect, the disclosure relates to a liquid tight electrical housing. The liquid tight electrical housing can include a housing body. The housing body of the liquid tight electrical housing can include a first housing body piece having a first wall having a first opening and a second opening, where the second opening includes a housing coupling feature. The housing body of the liquid tight electrical housing can also include a second housing body piece removably coupled to the first housing body piece, where the second housing body piece has a second wall having a third opening and a fourth opening, where the fourth opening includes a complementary housing coupling feature that removably couples to the housing coupling feature of the first housing body piece. The liquid tight electrical housing can also include a first coupling component disposed in the first opening of the first housing body piece, where the first coupling component includes a first electrical enclosure coupling feature that is configured to couple to a first electrical enclosure. The liquid tight electrical housing can further include a second coupling component disposed in the third opening of the second housing body piece, where the second coupling component includes a second electrical enclosure coupling feature that is configured to couple to a second electrical enclosure. The housing body can provide protection with respect to harmful effects on electrical equipment disposed within the housing body due to ingress of water.

In another aspect, the disclosure can generally relate to an electrical system. The electrical system can include a first electrical enclosure having a first enclosure wall that forms a first cavity, where the first cavity has disposed therein a first electrical cable. The electrical system can also include a second electrical enclosure having a second enclosure wall that forms a second cavity, where the second cavity has disposed therein a second electrical cable is disposed. The electrical system can further include a liquid tight electrical housing disposed between and coupled to the first electrical enclosure and the second electrical enclosure. The liquid tight electrical housing of the electrical system can include a housing body having a first housing body piece, where the first housing body piece includes a first housing body wall having a first opening and a second opening, where the second opening includes a housing coupling feature. The housing body of the liquid tight electrical housing of the electrical system can also include a second housing body piece, where the second housing body piece is removably coupled to the first housing body piece, where the second housing body piece includes a second housing body wall having a third opening and a fourth opening, where the fourth opening includes a complementary housing coupling feature that removably couples to the housing coupling feature of the first housing body piece. The liquid tight electrical housing of the electrical system can also include a first coupling component disposed in the first opening of the first housing body piece, where the first coupling component includes a first electrical enclosure coupling feature that is configured to couple to the first electrical enclosure. The liquid tight electrical housing of the electrical system can further include a second coupling component disposed in the third opening of the second housing body piece, where the second coupling component includes a second electrical enclosure coupling feature that is configured to couple to the second electrical enclosure. The first electrical cable and the second electrical cable can be coupled to each other within the housing body. The housing body can provide protection with respect to harmful effects on the first electrical cable and the second electrical cable due to ingress of water.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 6A-7B show coupling components of a liquid tight electrical housing in accordance with certain example embodiments.

DETAILED DESCRIPTION

In general, example embodiments provide systems, methods, and devices for liquid tight electrical housings. Example liquid tight electrical housings provide a number of benefits. Such benefits can include, but are not limited to, ease of access, compliance with applicable industry standards, lower cost, ease of installation, and protection of electrical contents.

The example embodiments discussed herein can be directed to any type of application (e.g., a PV solar system, generation control systems, branch circuit management and protection). A user may be any person that interacts with example electrical housings. Examples of a user may include, but are not limited to, an engineer, an electrician, an instrumentation and controls technician, a mechanic, an operator, a consultant, a contractor, and a manufacturer's representative. Further, as used herein, the term "diameter" is used to describe a dimension of a component of a liquid tight electrical housing. A diameter can be used to describe a dimension for a circular component, an oval-shaped component, a square-shaped component, a rectangular component, a hexagonally-shaped component, or any other shape for a component. For example, a diameter can be used to describe a dimension from one side of a coupling component to another side of the coupling component, regardless of the shape of the coupling component.

As defined herein, an electrical enclosure is any type of cabinet or enclosure inside of which is disposed electrical and/or electronic equipment. Such electrical and/or electronic equipment can include, but is not limited to, electrical cables and/or electrical conductors. Examples of an electrical enclosure can include, but are not limited to, a junction box, a motor control center, a breaker box, an electrical housing (such as the example liquid tight electrical housing described herein), a conduit, a control panel, an indicating panel, and a control cabinet. Electrical enclosures that have a door, a cover, or some other similar form of access (e.g., any of the above-listed examples aside from a conduit) can be called a box herein. An electrical enclosure can have any of a number of shapes, stiffnesses, and/or sizes.

The electrical housings (or components thereof, such as the housing body) described herein can be made of one or more of a number of suitable materials to allow the electrical housing to meet certain standards and/or regulations while also maintaining durability in light of the one or more conditions under which the example electrical housings can be exposed. Examples of such materials can include, but are not limited to, aluminum, stainless steel, fiberglass, glass, plastic, and rubber.

Any components (e.g., housing body) of example electrical housings, or portions thereof, described herein can be made from a single piece (as from a mold, injection mold, die cast, or extrusion process). In addition, or in the alternative, one or more components (or portions thereof) of an electrical housing can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein can be made of one or more of a number of suitable materials, including but not limited to metal, rubber, and plastic.

A coupling feature (including a complementary coupling feature) as described herein can allow one or more components and/or portions of a liquid tight electrical housing (e.g., a coupling component, a housing body piece) to become mechanically and/or electrically coupled, directly or indirectly, to another portion of the liquid tight electrical housing. A coupling feature can include, but is not limited to, a portion of a hinge, an aperture, a recessed area, a protrusion, a slot, a spring clip, a tab, a detent, and mating threads. One portion of a liquid tight electrical housing can be coupled to another portion of the liquid tight electrical housing by the direct use of one or more coupling features.

In addition, or in the alternative, a portion of an example liquid tight electrical housing can be coupled to another portion of the liquid tight electrical housing using one or more independent devices that interact with one or more coupling features disposed on a component of the liquid tight electrical housing. Examples of such devices can include, but are not limited to, a pin, a hinge, a fastening device (e.g., a bolt, a screw, a rivet), epoxy, solder, welding material, and a spring. One coupling feature described herein can be the same as, or different than, one or more other coupling features described herein. A complementary coupling feature as described herein can be a coupling feature that mechanically couples, directly or indirectly, with another coupling feature.

In certain example embodiments, liquid tight electrical housings are subject to meeting certain standards and/or requirements. Examples of entities that set and/or maintain standards that can apply to liquid tight electrical housings can include, but are not limited to, the National Electric Code (NEC), the National Electrical Manufacturers Association (NEMA), the Institute of Electrical and Electronics Engineers (IEEE), and Underwriters' Laboratories (UL).

For example, the exemplary liquid tight electrical housing can be considered an enclosure that meets the NEMA 4X standard. In such a case, the liquid tight electrical housing is constructed to provide a degree of protection against, at least, corrosion, falling dirt, rain, sleet, snow, ice, windblown dust, splashing water, and hose-directed water. In some cases, the example liquid tight electrical housings described herein can be located, either permanently or temporarily, under water. Thus, the example liquid tight electrical housings described herein can meet these standards (e.g., the housing body provides protection with respect to harmful effects on electrical equipment disposed within the housing body due to the ingress of water). Use of example embodiments described herein meet (and/or allow a corresponding device to meet) such standards when required. In some (e.g., PV solar) applications, additional standards particular to that application may be met by the example liquid tight electrical housings described herein.

In some cases, the example liquid tight electrical housings described herein can be located in hazardous locations or environments. A hazardous location or environment is a place where concentrations of vapor, dust, and/or flammable gas can exist. Electrical equipment, including electrical enclosures, that are positioned in such a hazardous location must be specially designed and tested to ensure that the equipment does not initiate or propagate an explosion due to arcing or high surface temperature. An electrical enclosure located in a hazardous location must meet certain strict industry standards set by a number of industry safety experts. For example, in the United States, NEMA sets standards (often in conjunction with or adopted by other expert third party industry groups, such as the American National Standards Institute ("ANSI")) for electrical enclosures in hazardous locations. Examples of such standards can include, but are not limited to, NEMA 7, NEMA 8, and NEMA 9.

Example embodiments of liquid tight electrical housings will be described more fully hereinafter with reference to the accompanying drawings, in which example embodiments of liquid tight electrical housings are shown. Liquid tight electrical housings may, however, be embodied in many different forms and should not be construed as limited to the example embodiments set forth herein. Rather, these example embodiments are provided so that this disclosure will be thorough and complete, and will fully convey the scope of liquid tight electrical housings to those of ordinary skill in the art. Like, but not necessarily the same, elements (also sometimes called components) in the various figures are denoted by like reference numerals for consistency.

Terms such as "first", "second", "top", "side", "width", "length", "bottom", "thickness", "inner", "upper", and "lower" are used merely to distinguish one component (or part of a component or state of a component) from another. Such terms are not meant to denote a preference or a particular orientation, and are not meant to limit embodiments of liquid tight electrical housings. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
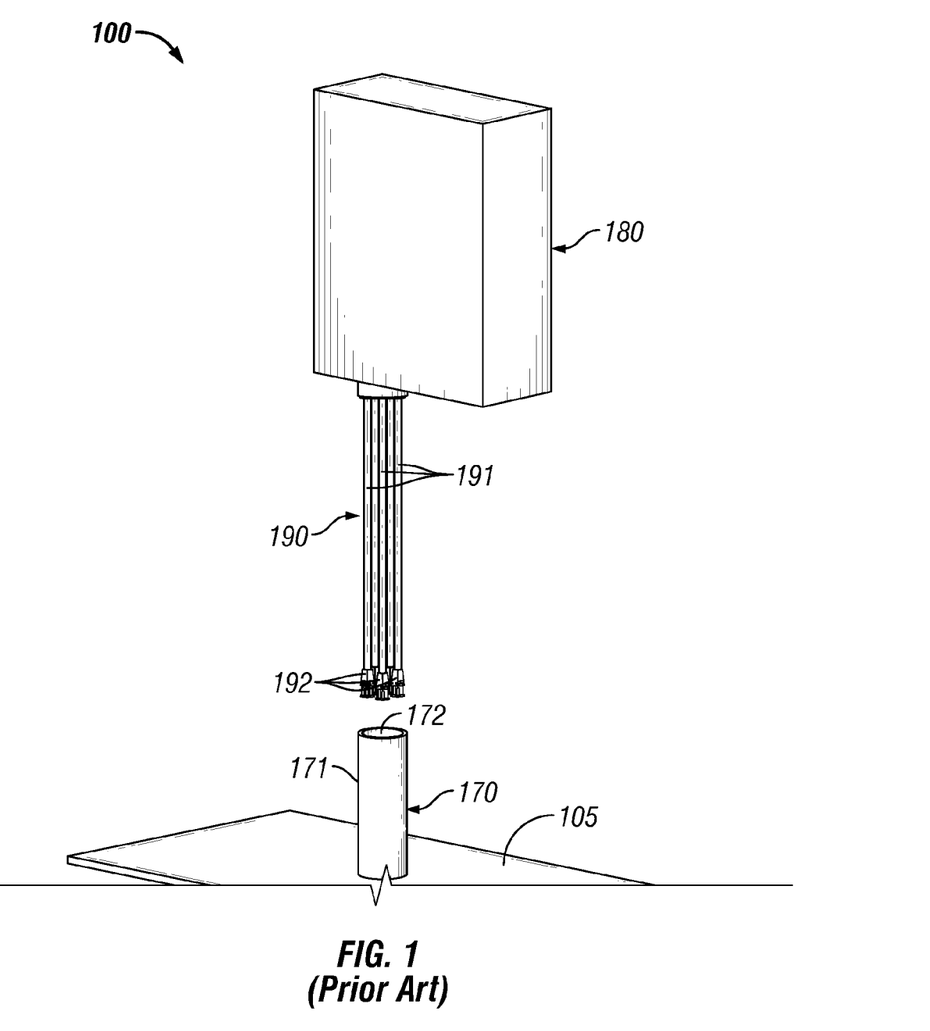
FIG. 1 shows a cable harness subassembly in accordance with example embodiments known in the art.

FIG. 1 depicts a cable harness subassembly 100 in accordance with example embodiments known in the art. The cable harness subassembly 100 includes an electrical enclosure 180 (in this case, a junction box), a cable harness 190 that is partly disposed within the electrical enclosure 180 and partly disposed outside the electrical enclosure 180, and another electrical enclosure 170 (in this case, a rigid conduit) that is disposed in and partially protrudes through a ground surface 105. In this case, the ground surface 105 is cement. In any case, the electrical enclosure 170 is fixed in place relative to the ground surface 105. The electrical enclosure 170 has a wall 171 that forms a cavity 172.

The cable harness 190 includes a number of electrical conductors 191, where the distal end (the part of the cable harness 190 disposed outside the electrical enclosure 180) of each electrical conductor 191 is terminated with an electrical connector 192. The electrical connectors 192 are configured to couple to complementary electrical connectors of an electrical cable (e.g., another cable harness) disposed within the cavity 172 of the electrical enclosure 170. In some cases, the cable harness 190 and the electrical enclosure 180 can be a pre-assembled item.

Figure 2A:
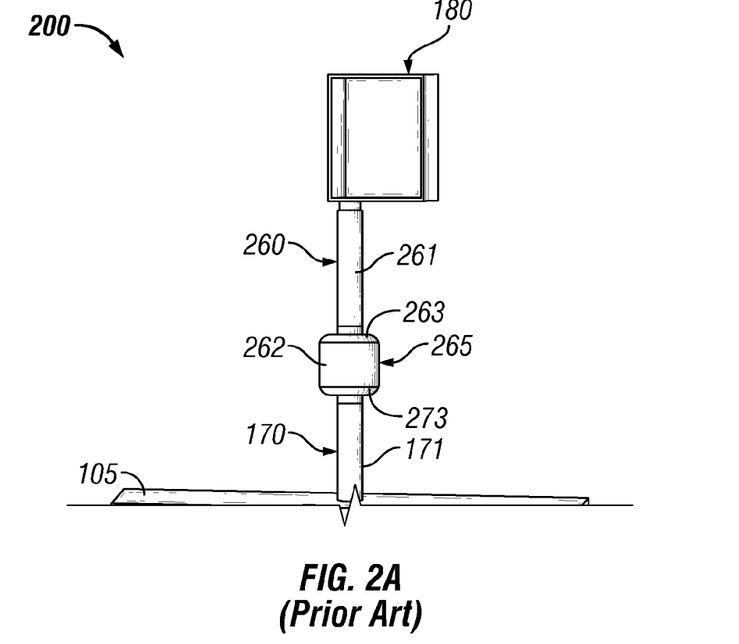
FIGS. 2A and 2B show a cable harness assembly in accordance with example embodiments known in the art.
Figure 2B:
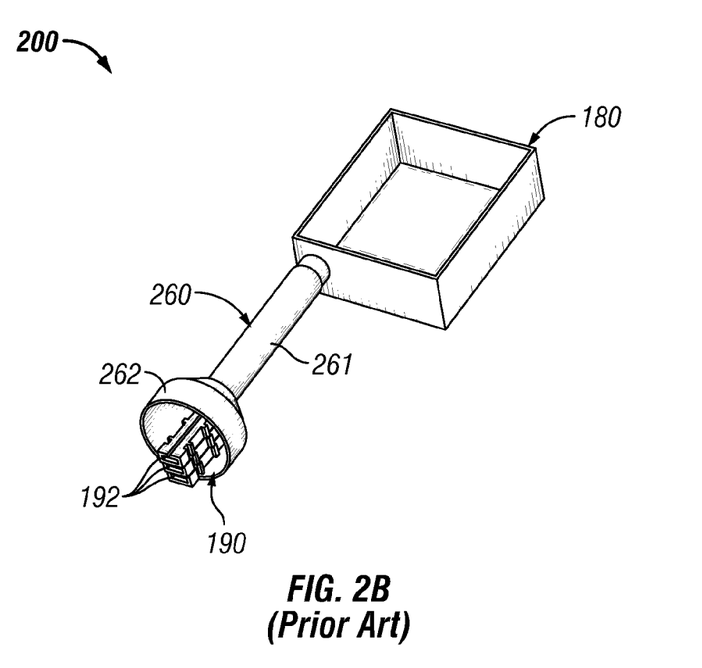

FIGS. 2A and 2B depict a cable harness assembly 200 in accordance with example embodiments known in the art. The cable harness assembly 200 includes the cable harness subassembly 100 of FIG. 1. In addition to the cable harness subassembly 100 described above, the cable harness assembly 200 of FIGS. 2A and 2B includes an electrical enclosure 260 (in this case, a rigid conduit) coupled to electrical enclosure 180. The electrical enclosure 260 has a wall 261 inside of which the cable harness 190 (e.g., the portion of the cable harness 190 that is visible in FIG. 1) is disposed.

In addition, the cable harness assembly 200 includes an electrical housing 265 coupled to the electrical enclosure 260. Specifically, the electrical housing 265 is coupled to an end of the electrical enclosure 260 opposite the end of the electrical enclosure 260 coupled to electrical enclosure 180. The electrical housing 265 encloses the electrical connectors 192 of the cable harness 190 as well as the complementary electrical connectors of the electrical cable disposed within the cavity 172 of the electrical enclosure 170.

The electrical housing 265 includes a top section 262 and a bottom section 273. The top section 262 can include a transition piece 263 that couples to the electrical enclosure 260. Similarly, the bottom section 272 can include a transition piece (hidden from view) that couples to the electrical enclosure 170. With the configuration of the cable harness assembly 200, performing maintenance, reconfiguration, and/or replacement of the components disposed within the electrical housing 265 (e.g., electrical connectors 192) cannot be performed without compromising the electrical housing 265 and/or at least one electrical connector directly coupled to the electrical housing 265, or moving a subassembly that includes the electrical enclosure 180 and the electrical enclosure 260. In some cases, the cable harness 190, the electrical enclosure 260, and the electrical enclosure 180 can be a pre-assembled item.

Figure 3A:
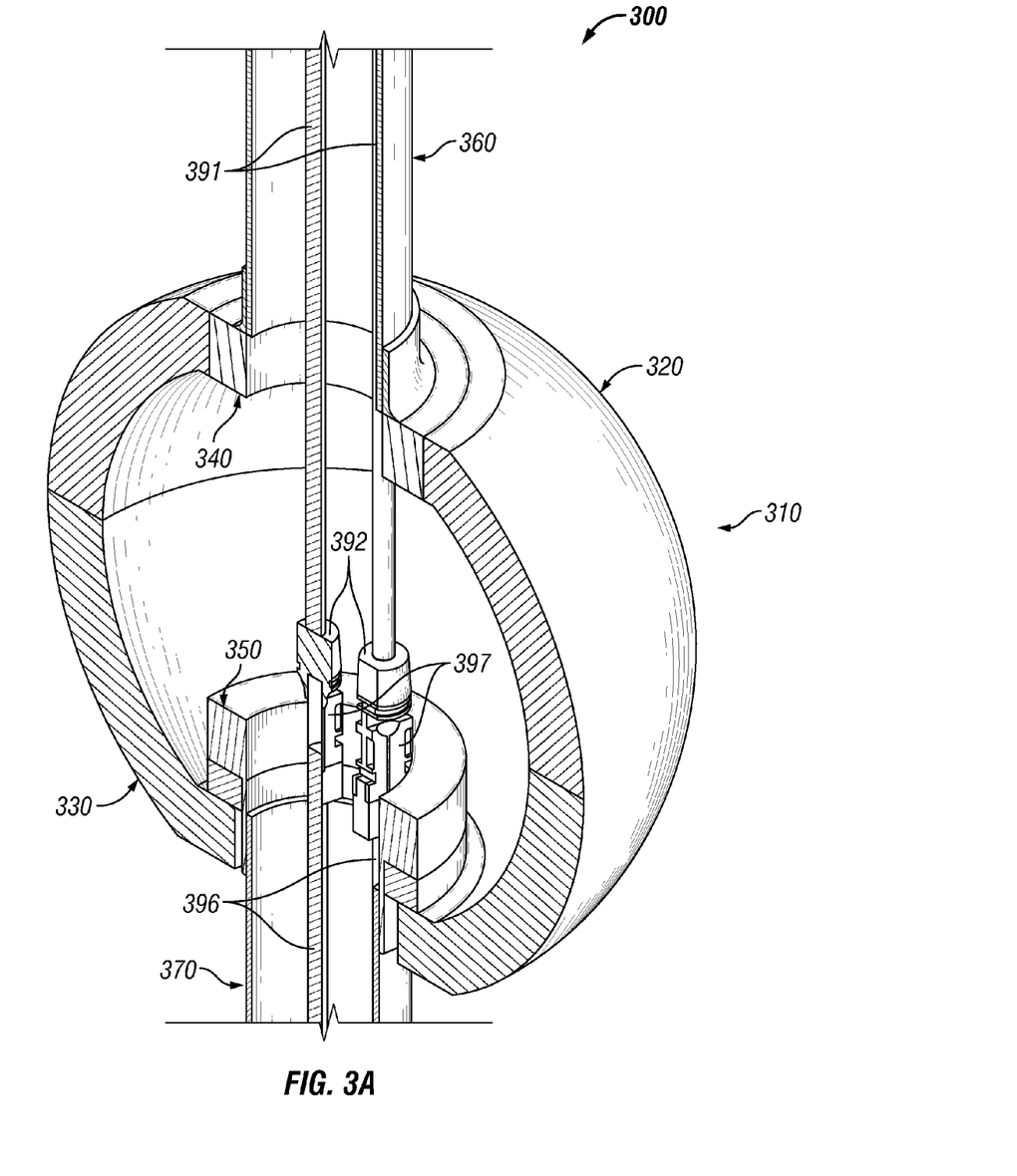
FIGS. 3A and 3B show an electrical system that includes a liquid tight electrical housing in accordance with certain example embodiments.
Figure 3B:
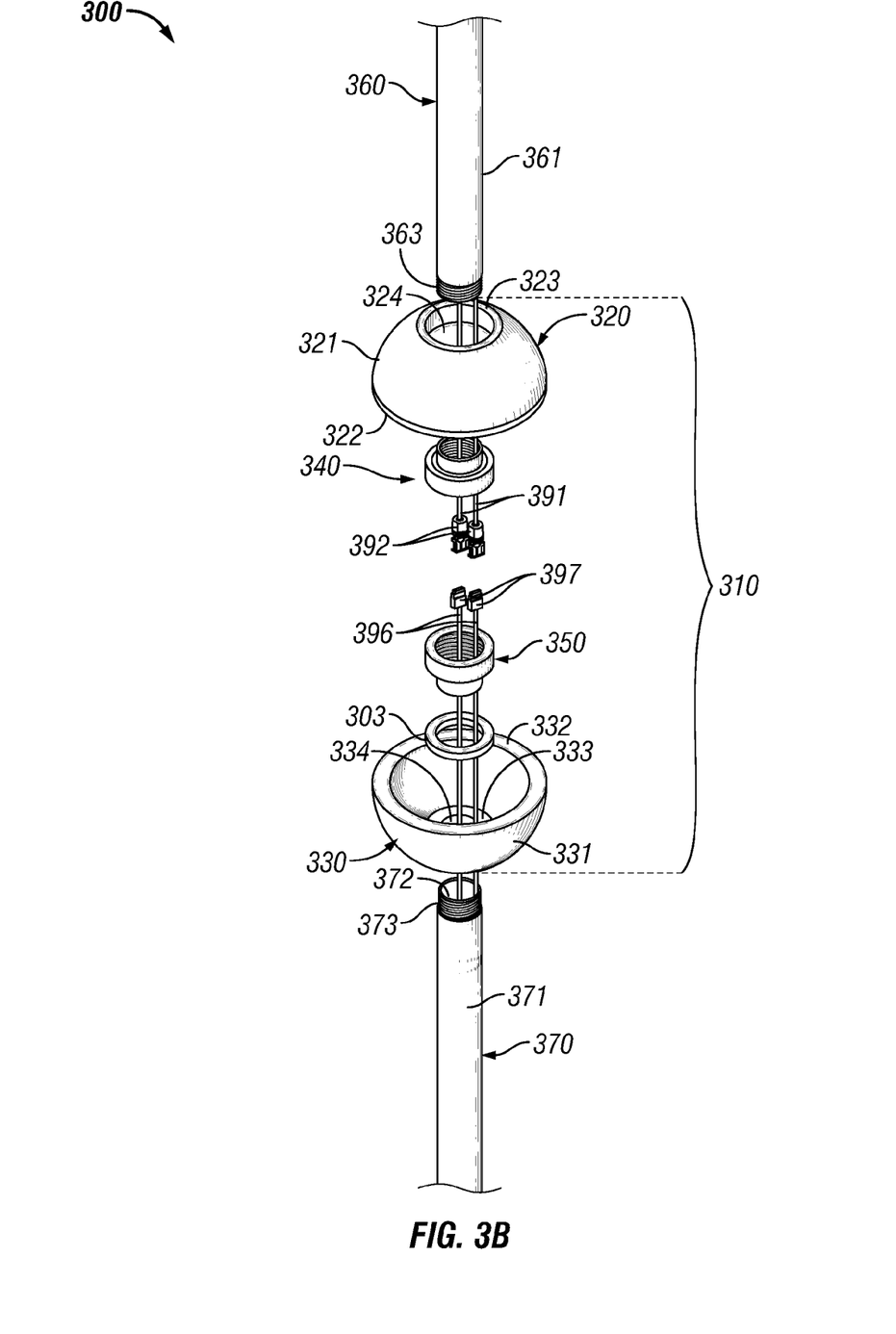
Figure 4:
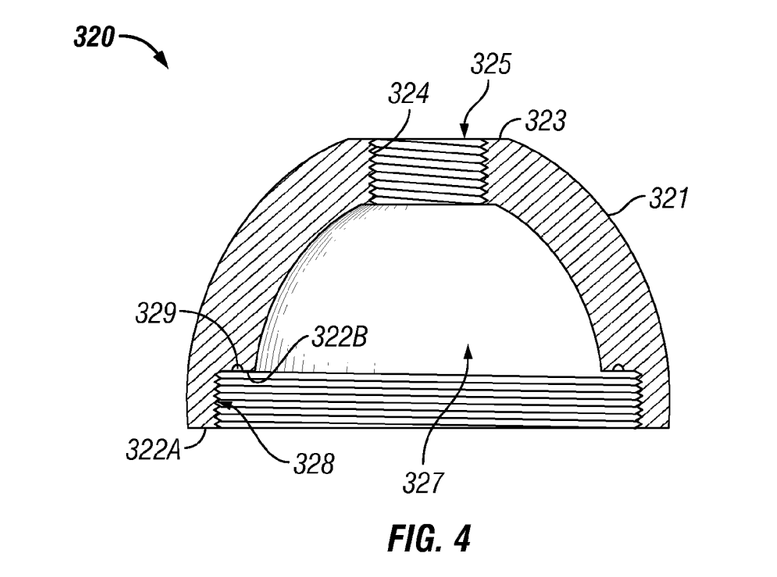
FIGS. 4 and 5 show a housing body of a liquid tight electrical housing in accordance with certain example embodiments.
Figure 5:
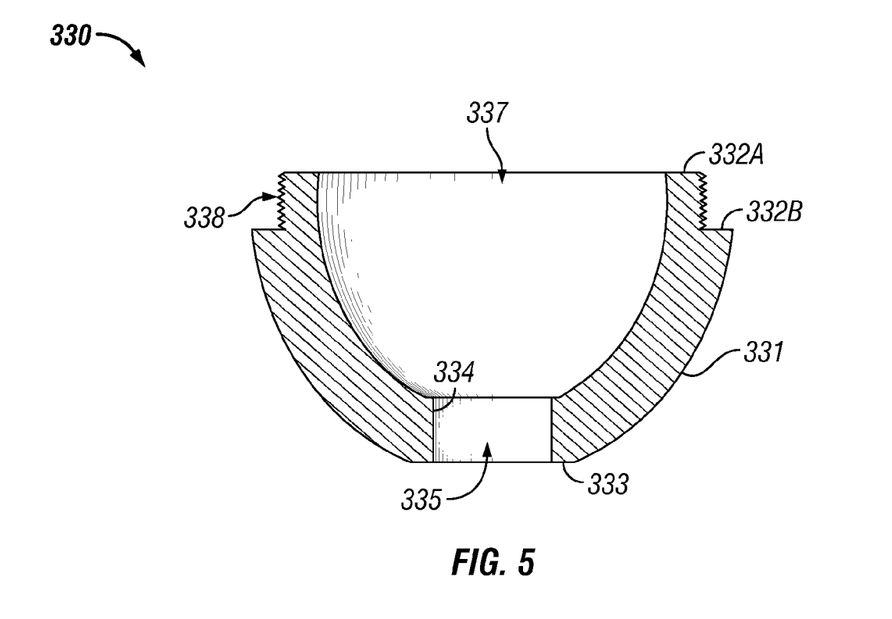
Figure 6A:
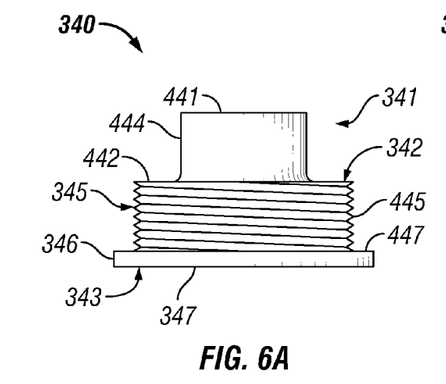
Figure 6B:
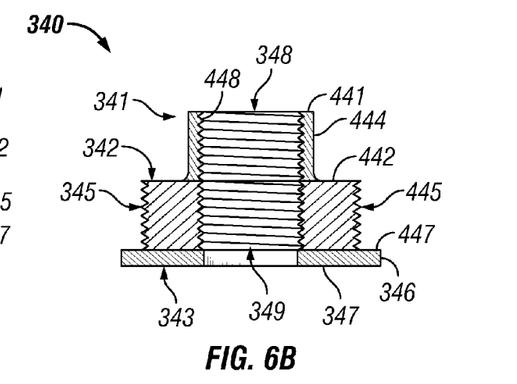
Figure 7A:
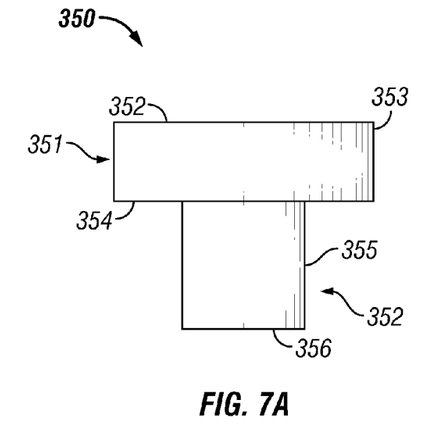
Figure 7B:
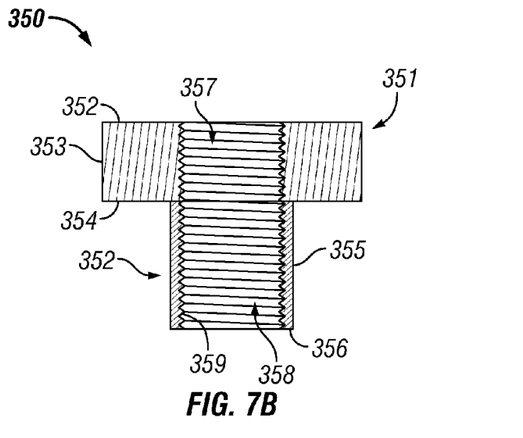

FIGS. 3A-7B show various views of some or all of a cable harness assembly 300 that includes a liquid tight electrical housing 310 in accordance with certain example embodiments. Specifically, FIGS. 3A and 3B show a cross-sectional side perspective view and an exploded view, respectively, of a portion of the cable harness assembly 300 that includes the liquid tight electrical housing 310. FIGS. 4 and 5 show a cross-sectional side view of housing body pieces (housing body piece 320 in FIG. 4 and housing body piece 330 in FIG. 5) of a housing body of the liquid tight electrical housing 310. FIGS. 6A and 6B show a side view and a cross-sectional side view of a coupling component 340 of the liquid tight electrical housing 310. FIGS. 7A and 7B show a side view and a cross-sectional side view of another coupling component 350 of the liquid tight electrical housing 310. In one or more embodiments, one or more of the features shown in FIGS. 3A-7B may be omitted, added, repeated, and/or substituted. Accordingly, embodiments of a liquid tight electrical housing (or portions thereof) should not be considered limited to the specific arrangements of components shown in FIGS. 3A-7B.

Referring to FIGS. 1-7B, the electrical enclosure 360 of FIGS. 3A and 3B can be substantially the same as the electrical enclosure 160 of FIGS. 1-2B. Similarly, the electrical enclosure 370 of FIGS. 3A and 3B can be substantially the same as the electrical enclosure 170 of FIGS. 1-2B. The liquid tight electrical housing 310 is configured to replace the electrical housing 265 of FIGS. 2A and 2B. Specifically, the liquid tight electrical housing 310 can be opened and reclosed without compromising itself (e.g., continuing to meet applicable standards and/or regulations) or any other portions (e.g., electrical enclosure 360, electrical enclosure 370) of the cable harness assembly 300.

In certain example embodiments, the liquid tight electrical housing 310 includes a housing body piece 320 of a housing body, a housing body piece 330 of the housing body, a coupling component 340, and another coupling component 350. In addition to FIGS. 3A and 3B, FIG. 4 shows the housing body piece 320 of the housing body. The housing body piece 320 can have a wall 321 that has one or more openings. For example, as shown in FIGS. 3A, 3B, and 4, there can be an opening 325 at the top end 323 of the wall 321 and an opening 327 at the bottom end 322 of the wall 321 of the housing body piece 320. The opening 327 and the opening 325 can have any of a number of shapes when viewed from above, including but not limited to circular (as shown in FIGS. 3A, 3B, and 4), oval, square, and hexagonal. These openings, as well as any other openings in the wall 321 of the housing body piece 320, can be disposed at any other point on the wall 321.

The housing body piece 320 can include one or more coupling features to allow the housing body piece 320 to couple to one or more other components of the liquid tight electrical housing 310. For example, as shown in FIGS. 3A-4, the opening 325 can include a coupling feature 324 to allow the housing body piece 320 to couple to the coupling component 340. In this case, the coupling feature 324 is mating threads disposed along some or all of the wall that defines the opening 325 in the wall 321. Alternatively, there may not be any coupling feature disposed on or proximate to the opening 325. In such a case, the coupling component 340 (or a portion thereof) can be disposed in the opening 325 without being connected or otherwise coupled to the housing body piece 320.

As another example, the opening 327 can include a coupling feature 328. For example, in this case, the coupling feature 328 is mating threads disposed along some or all of the wall that defines (at least in part) the opening 327 in the wall 321. More specifically, the bottom end 322 of the wall 321 of the housing body piece 320 is divided into an outer portion 322A and an inner portion 322B, with the coupling feature 328 disposed therebetween. The outer portion 322A is vertically offset from the inner portion 322B by a distance as to complement the configuration of the top end 332 of the wall 331 of the housing body piece 330, described below. Alternatively, there may not be any coupling feature disposed on or proximate to the opening 327.

In certain example embodiments, the housing body piece 320 can include one or more channels adjacent to and/or integrated with a coupling feature. In such a case, a sealing device (e.g., gasket, o-ring, silicone) can be disposed within such a channel to help prevent certain elements (e.g., dust, moisture) outside the liquid tight electrical housing 310 from entering the interior of the liquid tight electrical housing 310. For example, as shown in FIG. 4, a channel 329 can be disposed on the inner portion 322B of the wall 321. Examples of other locations on the housing body piece 320 where a channel can be disposed can include, but are not limited to, the inner portion 322A and the inner surface of the top end 323.

The housing body piece 330 can have a wall 331 that has one or more openings. For example, as shown in FIGS. 3A, 3B, and 4, there can be an opening 335 at the bottom end 333 of the wall 331 and an opening 337 at the top end 332 of the wall 331 of the housing body piece 330. The opening 337 and the opening 335 can have any of a number of shapes when viewed from above, including but not limited to circular (as shown in FIGS. 3A, 3B, and 4), oval, square, and hexagonal. These openings, as well as any other openings in the wall 331 of the housing body piece 330, can be disposed at any other point on the wall 331.

The housing body piece 330 can include one or more coupling features to allow the housing body piece 330 to couple to one or more other components of the liquid tight electrical housing 310. For example, the opening 335 can include a coupling feature (not shown) that couples to the coupling component 350. In such a case, the coupling feature can be mating threads disposed along some or all of the wall 334 that defines the opening 335 in the wall 331. Alternatively, as shown in FIGS. 3A, 3B, and 5, there may not be any coupling feature disposed on or proximate to the opening 335. In such a case, the coupling component 350 (or a portion thereof) can be disposed in the opening 335 without being connected or otherwise coupled to the housing body piece 330.

Similarly, the opening 337 can include a coupling feature 338. For example, in this case, the coupling feature 338 is mating threads disposed along some or all of the wall that defines (at least in part) the opening 337 in the wall 331. More specifically, the bottom end 332 of the wall 331 of the housing body piece 330 is divided into an outer portion 332A and an inner portion 332B, with the coupling feature 338 disposed therebetween. The outer portion 332A is vertically offset from the inner portion 332B by a distance as to complement the configuration of the bottom end 322 of the wall 321 of the housing body piece 320, as described above. Alternatively, there may not be any coupling feature disposed on or proximate to the opening 337.

When the housing body piece 330 and the housing body piece 320 are coupled to each other (or abut against each other), the housing body if formed. The housing body can have one or more of a number of shapes. Examples of such shapes can include, but are not limited to, a sphere and an ellipsoid. The shape, size, and dimensions of the housing body can be symmetrical or asymmetrical about an axis defined by where the housing body piece 330 and the housing body piece 320 are coupled to each other (or abut against each other).

In certain example embodiments, the housing body piece 330 can include one or more channels adjacent to and/or integrated with a coupling feature. In such a case, a sealing device (e.g., gasket, o-ring, silicone) can be disposed within such a channel to help prevent certain elements (e.g., dust, moisture) outside the liquid tight electrical housing 310 from entering the interior of the liquid tight electrical housing 310. While no such channels are shown in FIG. 5, examples of locations on the housing body piece 330 where a channel can be disposed can include, but are not limited to, the inner portion 332A, the inner portion 332B, and the inner surface of the bottom end 333.

In certain example embodiments, the coupling component 340 of the liquid tight electrical housing 310 includes an upper portion 341, a lower portion 342, and an optional base portion 343. The upper portion 341 can have a top surface 441 and a side surface 444. The lower portion 342 can abut against the upper portion 341 and also have a top surface 442 and a side surface 445. The optional base portion 343 can abut against the lower portion 342 and have a top surface 447, a side surface 346, and a bottom surface 347. There can be a cavity 349, formed by an inner surface 448, that traverses the height of the coupling component 340.

The upper portion 341, the lower portion 342, the base portion 343, and the cavity 349 of the coupling component 340 can have any of a number of shapes when viewed from above, including but not limited to circular (as shown in FIGS. 3A, 3B, 6A, and 6B), oval, square, and hexagonal. The diameter of the inner surface 448 forming the cavity 349 can be less than the diameter of the side surface 444 of the upper portion 341. The diameter of the side surface 444 of the upper portion 341 can be less than the diameter of the side surface 445 of the lower portion 342. The diameter of the side surface 445 of the lower portion 342 can be less than the diameter of the side surface 346 of the base portion 343.

In some cases, the height of the lower portion 342 can be substantially the same as the height of the opening 325 of the housing body piece 320 inside of which the coupling component 340 can be disposed. Further, the diameter of a portion (in this case, the lower portion 342) of the coupling component 340 can be substantially the same as, or slightly less than, the diameter of the opening 325 of the housing body piece 320.

In certain example embodiments, the coupling component 340 of the liquid tight electrical housing 310 can have one or more of a number of coupling features to allow the coupling component 340 to couple to one or more other components of the liquid tight electrical housing 310. For example, as shown in FIGS. 3A, 3B, 6A and 6B, the side surface 445 of the lower portion 342 can include a coupling feature 345 to allow the lower portion 342 of the coupling component 340 to couple to the opening 325 of the housing body piece 320. In this case, the coupling feature 345 is mating threads disposed along some or all of the side surface 445 and complement the coupling feature 324 of the opening 325. Alternatively, there may not be any coupling feature disposed on or proximate to the side surface 445. In such a case, the coupling component 340 (or a portion thereof) can be disposed in the opening 325 without being connected or otherwise coupled to the housing body piece 320. This would allow the coupling component 340 and the housing body piece 320 to rotate independently of each other.

As another example, as shown in FIGS. 3A, 3B, 6A and 6B, the inner surface 448 of the upper portion 341 can include a coupling feature 348 to allow the upper portion 341 of the coupling component 340 to couple a complementary coupling feature (in this case, coupling feature 363 disposed on a portion of the electrical enclosure wall 361) of an electrical enclosure (in this case, electrical enclosure 360). In this case, the coupling feature 348 is mating threads disposed along some or all of the inner surface 448 of the upper portion 341 (and, in some cases, also of the lower portion 342 and the base portion 343) and complement the coupling feature 363 of the electrical enclosure 360. Alternatively, there may not be any coupling feature disposed on or proximate to the inner surface 448. In such a case, the electrical enclosure 360 can be coupled to some portion of the liquid tight electrical housing 310 in some other way.

When the electrical housing 360 is coupled to the liquid tight electrical housing 310 (in this case, when the electrical housing 360 is coupled to the coupling component 340 and the coupling component 340 is coupled to the housing body piece 320), one or more electrical conductors 391 (also called one or more electrical cables 391) can be disposed in the cavity 362 formed by the electrical enclosure wall 361 of the electrical enclosure 360, and the electrical connector 392 at the end of each electrical conductor 391 can be disposed proximate to the opening 327 of the housing body piece 320. In PV solar system applications, the electrical cable 391 can be called a cord grip.

The optional base portion 343 of the coupling component 340 can be used as a stop to prevent the coupling component 340 from being disposed too far into the opening 325 of the housing body piece 320. For example, the base portion 343 can abut against the inner surface of the top end 323 of the housing body piece 320, thus preventing the coupling component 340 from being disposed further upward into the opening 325 of the housing body piece 320. In addition, or in the alternative, some other feature (e.g., a tab, a detent, a termination of a coupling feature) of the coupling component 340 and/or the housing body piece 320 can be added and/or used to limit the vertical travel of the coupling component 340 relative to the housing body piece 320.

In certain example embodiments, the coupling component 350 of the liquid tight electrical housing 310 includes an upper portion 351, and a lower portion 352. The upper portion 351 can have a top surface 352, a bottom surface 354, and a side surface 353. The lower portion 352 can abut against the upper portion 351 and have a bottom surface 356 and a side surface 355. There can be a cavity 357, formed by an inner surface 359, that traverses the height of the coupling component 350.

The upper portion 351, the lower portion 352, and the cavity 349 of the coupling component 350 can have any of a number of shapes when viewed from above, including but not limited to circular (as shown in FIGS. 3A, 3B, 7A, and 7B), oval, square, and hexagonal. The diameter of the inner surface 359 forming the cavity 357 can be less than the diameter of the side surface 355 of the lower portion 352. The diameter of the side surface 355 of the lower portion 352 can be less than the diameter of the side surface 353 of the upper portion 351.

In some cases, the height of the lower portion 352 can be substantially the same as, or greater than, the height of the opening 335 of the housing body piece 330 inside of which the coupling component 350 can be disposed. Further, the diameter of a portion (in this case, the lower portion 352) of the coupling component 350 can be substantially the same as, or slightly less than, the diameter of the opening 335 of the housing body piece 330.

In certain example embodiments, the coupling component 350 of the liquid tight electrical housing 310 can have one or more of a number of coupling features to allow the coupling component 350 to couple to one or more other components of the liquid tight electrical housing 310. For example, while not shown in FIGS. 3A-7B, the side surface 355 of the lower portion 352 can include a coupling feature (e.g., mating threads) to allow the lower portion 352 of the coupling component 350 to couple to complementary coupling features (also not shown in FIGS. 3A-7B) disposed on the opening 335 of the housing body piece 330. Alternatively, as shown in FIGS. 3A, 3B, 7A, and 7B, there may not be any coupling feature disposed on or proximate to the side surface 355. In such a case, the coupling component 350 (or a portion thereof) can be disposed in the opening 335 without being connected or otherwise coupled to the housing body piece 330. This would allow the coupling component 350 and the housing body piece 330 to rotate independently of each other.

As another example, as shown in FIGS. 3A, 3B, 7A and 7B, the inner surface 359 of the lower portion 352 can include a coupling feature 358 to allow the lower portion 352 of the coupling component 350 to couple a complementary coupling feature (in this case, coupling feature 373 disposed on a portion of the electrical enclosure wall 371) of an electrical enclosure (in this case, electrical enclosure 370). In this case, the coupling feature 358 is mating threads disposed along some or all of the inner surface 359 of the lower portion 352 (and, in some cases, also of the upper portion 351) and complement the coupling feature 373 of the electrical enclosure 370. Alternatively, there may not be any coupling feature disposed on or proximate to the inner surface 359. In such a case, the electrical enclosure 370 can be coupled to some portion of the liquid tight electrical housing 310 in some other way.

When the electrical housing 370 is coupled to the liquid tight electrical housing 310 (in this case, when the electrical housing 370 is coupled to the coupling component 350 and the coupling component 350 abuts against the housing body piece 330), one or more electrical conductors 396 (also called one or more electrical cables 396) can be disposed in the cavity 372 formed by the electrical enclosure wall 371 of the electrical enclosure 370, and the electrical connector 397 at the end of each electrical conductor 396 can be disposed proximate to the opening 337 of the housing body piece 330. Electrical connector 392 and electrical connector 397 can have any of a number of forms to allow them to couple to each other, either directly or indirectly. Such forms can include but are not limited to a pin-and-socket connector, a spade connector, a ring connector, a terminal block, electrical tape, and a twist connector.

As described above, in certain example embodiments, one or more sealing devices can be disposed in a channel of a component of the liquid tight electrical housing 310. In addition, or in the alternative, a sealing device (e.g., sealing device 303) can be disposed between two components of the liquid tight electrical housing 310 without a channel. For example, as shown in FIGS. 3A and 3B, sealing device 303 can be placed over the lower portion 352 of the coupling component 350, between the upper portion 351 of the coupling component 350 and the inner surface of the bottom end 333 of the housing body piece 330. The purpose of such sealing devices (e.g., sealing device 303) can serve substantially the same purpose of the sealing devices described above.

Such sealing devices can be used when two components of the liquid tight electrical housing 310 are freely movable (e.g., rotatable) with respect to each other. For example, as shown in FIGS. 3A-7B, the side surface 355 of the lower portion 352 of the coupling component 350 and the opening 335 of the housing body piece 330 are without coupling features, and so the coupling component 350 and the housing body piece 330 can be freely rotatable with respect to each other. In such a case, the housing body piece 330 and the housing body piece 320 can be coupled to and decoupled from each other (using coupling features 328 and coupling features 338) without compromising the rest of the cable harness assembly 300.

In other words, the housing body can be opened (the housing body piece 330 and the housing body piece 320 can be coupled from each other) to access the electrical connectors 392 and the electrical connectors 397 without having to remove and/or destroy any other component of the cable harness assembly 300. The sealing device 303 (and/or other similar sealing devices at other locations) can be used to maintain a liquid tight seal and/or perform other functions necessary to allow the liquid tight electrical housing 310 to meet any applicable standards and/or regulations.

In certain example embodiments, one of the coupling components is coupled to a housing body piece using coupling features, while the other coupling component merely abuts against the other housing body piece. For example, as shown in FIGS. 3A-7B, the coupling component 340 is coupled to housing body piece 320 using coupling feature 345 and coupling feature 324, respectively, while the coupling component 350 merely abuts against the housing body piece 330. Such a configuration can allow a user to access the electrical connectors (e.g., electrical connectors 392, the electrical connectors 397) inside the housing body while allowing the liquid tight electrical housing 310 to continue to meet any applicable standards and/or regulations.

As an alternative, both coupling components can merely abut against their respective housing body piece. In such a case, multiple sealing devices, such as sealing device 303, can be used to allow the liquid tight electrical housing 310 to continue to meet any applicable standards and/or regulations while providing a user access to the electrical connectors (e.g., electrical connectors 392, the electrical connectors 397) inside the housing body.

As yet another alternative, both coupling components can be coupled to their respective housing body piece. In such a case, one or more of the coupling features would need to be specially designed. For example, if coupling feature 328 and coupling feature 324 of the housing body piece 320, coupling feature 345 of the coupling component 340, and coupling feature 338 of the housing body piece 330 are all mating threads, some of the mating threads (e.g., coupling feature 328 and coupling feature 338) can be threaded for one direction (e.g., right-handed thread), while the other mating threads (e.g., coupling feature 324 and coupling feature 345) can be threaded in an opposite direction (e.g., left-handed thread). This would cause at least a portion of the liquid tight electrical housing 310 to act as a turnbuckle, which could allow a user to access the electrical connectors (e.g., electrical connectors 392, the electrical connectors 397) inside the housing body while allowing the liquid tight electrical housing 310 to continue to meet any applicable standards and/or regulations.

Example embodiments provide for a liquid tight electrical housing. Specifically, certain example embodiments allow for a user to access the contents (e.g., electrical connectors, electrical conductors) inside the liquid tight electrical housing without compromising the structural integrity of the system or any components thereof. Further, example liquid tight electrical housings described herein are designed to meet any applicable industry standards and/or regulations. For example, by being liquid tight, the example liquid tight electrical housings can comply as a NEMA 4X enclosure. In some cases, the example liquid tight electrical housings described herein are so effective that, when assembled, they can be located, either permanently or temporarily, under water. Example embodiments provide for easier installation, easier servicing, and easier maintenance.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A liquid tight electrical housing, comprising:
   a first housing body piece comprising a first periphery wall having a first top opening and a first bottom opening, wherein the first bottom opening comprises a housing coupling feature;
   a second housing body piece removably coupled to the first housing body piece, wherein the second housing body piece comprises a second periphery wall having a second bottom opening and a second top opening, wherein the second top opening comprises a complementary housing coupling feature that removably couples to the housing coupling feature of the first housing body piece;
   a first coupling component disposed in the first top opening of the first housing body piece, wherein the first coupling component comprises a first conduit or box coupling feature that is configured to couple to a first coupling component coupling feature of a first conduit or box; and
   a second coupling component disposed in the second bottom opening of the second housing body piece, wherein the second coupling component comprises a second conduit or box coupling feature that is configured to couple to a second coupling component coupling feature of a second conduit or box,
   wherein the first housing body piece and the second housing body piece provide protection with respect to harmful effects on an electrical equipment disposed within a cavity formed by the first housing body piece and the second housing body piece due to ingress of water.

2. The liquid tight electrical housing of claim 1, wherein the first top opening of the first housing body piece comprises a third coupling component coupling feature that couples to a first housing body piece coupling feature of the first coupling component.

3. The liquid tight electrical housing of claim 2, wherein the third coupling component coupling feature of the first housing body piece and the first housing body piece coupling feature of the first coupling component comprise mating threads.

4. The liquid tight electrical housing of claim 1, further comprising:
 a sealing member disposed between the first coupling component and the first housing body piece.

5. The liquid tight electrical housing of claim 1, further comprising:
 a sealing member disposed between the second coupling component and the second housing body piece.

6. The liquid tight electrical housing of claim 1, further comprising:
 a sealing member disposed between the first housing body piece and the second housing body piece.

7. The liquid tight electrical housing of claim 1, wherein the housing coupling feature of the first housing body piece and the complementary housing coupling feature of the second housing body piece comprise mating threads.

8. The liquid tight electrical housing of claim 1, wherein the first conduit or box coupling feature comprises mating threads.

9. The liquid tight electrical housing of claim 1, wherein the second conduit or box coupling feature comprises mating threads.

10. The liquid tight electrical housing of claim 1, wherein the second housing body piece rotates freely with respect to the second coupling component.

11. The liquid tight electrical housing of claim 1, wherein the first housing body piece and the second housing body piece form a sphere when coupled to each other.

12. An electrical system, comprising:
 a first conduit or box comprising a first peripheral wall that forms a first cavity and a first coupling component coupling feature disposed in the first peripheral wall, wherein the first cavity has disposed therein a first electrical cable;
 a second conduit or box comprising a second peripheral wall that forms a second cavity and a second coupling component coupling feature disposed in the second peripheral wall, wherein the second cavity has disposed therein a second electrical cable; and
 a liquid tight electrical housing disposed between and coupled to the first conduit or box and the second conduit or box, wherein the liquid tight electrical housing comprises:
  a first housing body piece comprising a third peripheral wall having a first top opening and a first bottom opening, wherein the first bottom opening comprises a housing coupling feature;
  a second housing body piece removably coupled to the first housing body piece, wherein the second housing body piece comprises a fourth peripheral wall having a second bottom opening and a second top opening, wherein the second top opening comprises a complementary housing coupling feature that removably couples to the housing coupling feature of the first housing body piece;
  a first coupling component disposed in the first top opening of the first housing body piece, wherein the first coupling component comprises a first conduit or box coupling feature that couples to the first complementary coupling feature of the first conduit or box; and
  a second coupling component disposed in the second bottom opening of the second housing body piece, wherein the second coupling component comprises a second conduit or box coupling feature couples to the second complementary coupling feature of the second conduit or box,
 wherein the first electrical cable and the second electrical cable are coupled to each other within a third cavity formed by the first housing body piece and the second housing body piece, and
 wherein the first housing body piece and the second housing body piece provide protection with respect to harmful effects within the third cavity on the first electrical cable and the second electrical cable due to ingress of water.

13. The electrical system of claim 12, wherein the first electrical cable and the second electrical cable are accessed by decoupling the first housing body piece and the second housing body piece.

14. The electrical system of claim 12, wherein the second conduit or box is rigid conduit or rigid box.

15. The electrical system of claim 14, wherein the rigid conduit or rigid box is at least partially encased, at least in part, in concrete.

16. The electrical system of claim 12, wherein the first electrical cable is a cord grip to attach to a photovoltaic solar system.

17. The electrical system of claim 12, wherein the first housing body piece is fixedly coupled to the first coupling component, and wherein the second housing body piece freely rotates with respect to the second coupling component.

18. The electrical system of claim 12, wherein the first conduit or box is flexible.

19. The electrical system of claim 12, wherein the liquid tight electrical housing is located under water.

20. The electrical system of claim 12, wherein the liquid tight electrical housing is located in a hazardous location.

* * * * *